(No Model.)

G. W. CAMPBELL.
CORN PLANTER.

No. 431,935. Patented July 8, 1890.

Witnesses
C. W. Miles
T. Simmons

Inventor
George W. Campbell
By his Attorneys Wood & Boyd

UNITED STATES PATENT OFFICE.

GEORGE W. CAMPBELL, OF LIMA, OHIO.

CORN-PLANTER.

SPECIFICATION forming part of Letters Patent No. 431,935, dated July 8, 1890.

Application filed October 31, 1889. Serial No. 328,746. (No model.)

*To all whom it may concern:*

Be it known that I, GEORGE W. CAMPBELL, a citizen of the United States, and a resident of Lima, in the county of Allen and State of Ohio, have invented certain new and useful Improvements in Corn-Planters, of which the following is a specification.

My invention relates to that class of corn-planters shown in Letters Patent No. 379,363, granted on the 13th of March, 1888, jointly to J. W. Campbell and myself.

The object of my invention is, first, to provide an improved spring-pressure device; second, to provide an adjustable planter-shoe; third, to provide improved covering-plates, and, fourth, to provide an improved guard, which sustains the cutter-shoes and covering-plates.

The various features of my invention will be fully set forth in the description of the accompanying drawings, making a part of this specification, in which—

Figure 3:
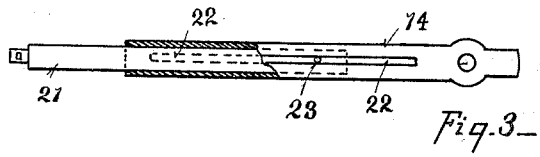
Figure 1:
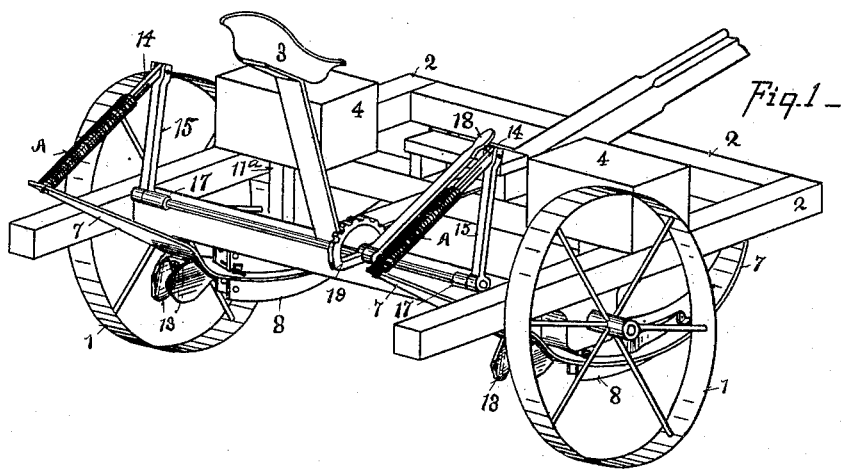
Figure 2:
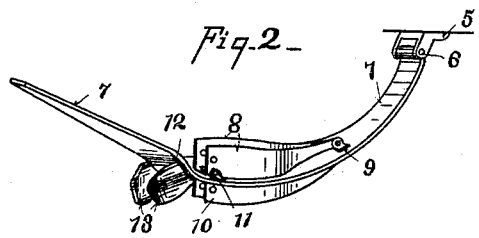

Figure 1 is a top plan view showing the covering-shoes raised up. Fig. 2 is a perspective view of the furrow, shoe-guard, and covering-plates. Fig. 3 is a sectional plan view of my improved telescopic rod.

1 1 represent the main wheels of the planter; 2, the frame; 3, the seat; 4, the seed-box mounted upon the frame.

5 represents a bracket, which is secured to the under side of the front rail 2, and is provided with ears, which are pierced to receive a pivot 6.

7 represents the shoe-guard pivotally attached at its front end to said bracket 5.

8 represents the shoes for opening the furrow, into which the seeds are dropped. Said shoes are attached by slotting out the guard-plates and dropping said shoes 8 within the slot and connecting them at the front end by the pivot 9.

10 represents a series of holes pierced through the rear end of the shoes 8. 11 represents a pin for holding said shoe in any desired vertical adjustment. The feeding-spouts 11ª pass down through said shoes 8 in the ordinary manner. By this means of constructing the shoes they may be adjusted to any soil or depth of covering. In the rear of the shoes 8 the guard-plates 7 are bent abruptly upward, as at 12. To the under side of this bend are attached the covering-plates 13. These covering-plates are wider than the opening in the heel of the shoe, and, being curved inward after the style of the mold-board of a plow, they form important functions in covering the corn. First, they draw the ground together, covering the seed and leaving a slight ridge; second, they smooth or press it down; third, the clods mashed by them are carried up through between the plates and guard and pass out of the way. If this guard-plate 7 ran back on a true line, the clods would lodge or catch, but being open upward, owing to the bend 12, the clods are allowed to clear themselves. The guard 7 extends rearwardly backward and upward, and to said guards are attached the telescope-rod-working spring-barrel 14, around which the spring A is coiled. The forward end of this barrel is supported upon the crank-arms 15, which spring from the rock-shaft 16. Said rock-shaft is suitably journaled to the frame by boxes 17.

18 represents a latch-lever, by which said rock-shaft is operated.

19 represents a segment-plate, into which the latch of lever 18 engages to hold it in any desired position.

In the device shown in the said former patent referred to the spring was supported upon two rods which lay side by side and connected by a pin. The strain upon these rods caused them to bend when drawn out and thus spoil the springs. By providing the sleeve or barrel 14 and having the telescope-rod 21 working and in said sleeve this objection is overcome. These rods are held in the sleeve by means of slot 22, which is pierced in the sleeve 14, and the pin 23, working in said slot. Consequently the rod 21 is free to move out and in the barrel 14 to compress and extend the spring. At the same time the two rods are kept in the same plane and all binding on the spring is avoided and a perfectly free motion is allowed. It will be seen that when the lever 18 is turned over in the position shown in Fig. 1 the telescopic rod 21 is drawn out to the full extent. The pin 23, catching on the end of the slot 22, holds the covering device up and away from the ground. When the latch-lever 18 is released and allowed to come back, the shoes drop upon the ground and bring the parts into position for use. They are free to rise and fall, each independent of the other. They may be adjusted to cover any desired depth, and the peculiar form of covering-plates leaves the ground in good condition. By pivoting the forward end of the guard 7 at some distance below the frame 2 the covering-shoe rises more nearly parallel and with less power than where it is pivoted up against the frame.

By the construction herein shown and described the shoes are raised more easily by the lever 18, and they rise and fall more freely. They leave the ground in better condition and all binding of the tension-spring rod is avoided.

It will be obvious that any desired number of shoes 8 and shoe-guards 7 may be employed on one and the same frame, and a similar number of seed-spouts, so that any desired number of rows of seed may be planted at the same time.

I have shown my device applied to corn-planters; but it is obvious that it may be applied to wheat-sowers or other similar machines.

The sleeve 14 is shown square, and the rod 21 of similar shape working in the opening of said barrel or sleeve; but the shape is immaterial. The pin 23 is inserted some distance from the end of the rod 21, so that when the rod is pulled out to its fullest extent the projecting end of said rod has a bearing within the barrel 14 sufficiently long to prevent the bending of said rods, thereby maintaining them in the same parallel plane, which is very essential in the construction of the spring-holding device of a planter or seeder.

Having described my invention, what I claim is—

1. The combination, with the frame 2, of the bracket 5, secured thereto, the guard 7, pivotally attached at its forward end to the bracket 5 at a point below the frame 2, and the shoe 8, pivotally attached to and depending through the guard, substantially as described.

2. In a seeder, the combination, with the pivotally-attached guard 7, of the V-shaped shoe 8, pivotally attached at its forward end to the guard 7 and vertically adjustable therein, substantially as described.

3. In combination with the guard 7 and the V-shaped shoe 8, the curved or inclined plates 13, having a free opening above and between the guard, substantially as specified.

4. The combination, with the pivotally-attached guard 7, of the V-shaped shoe 8, pivotally attached at its forward end to the guard 7 and vertically adjustable therein, and the curved plate 13, having a free opening above and between the guard, substantially as described.

5. In a seeding device having a frame and a furrow-opener and seed-covering device, composed, substantially, of the guard 7 and the shoe 8, hinged thereto, the covering-plates 13, having a free opening above their upper edges and between the guard-plates, substantially as specified.

6. In a seeder, the combination of the guard 7, hinged to the frame, and the V-shaped shoe 8, adjustably secured thereto, the said guard 7 having an upward bend 12, to the rear edge of which are attached covering-plates 13, substantially as specified.

7. In combination with the shoe 8 and guard 7 and spring-pressure device composed of the sleeve 14, forming a bearing-support for said spring, and the telescope-rod 21, supported therein and adapted to reciprocate, substantially as herein specified.

8. In a seed-planter, the combination of the shoe-guard 7, carrying the covering device, the spring-barrel 14, and telescope-rod 21 and spring 22, connected to the shoe-supports and to the crank-arm 15 and operated by the rock-shaft and lever, substantially as herein specified.

In testimony whereof I have hereunto set my hand.

GEORGE W. CAMPBELL.

Witnesses:
G. W. MILES,
GEORGE ASHTON.